United States Patent [19]

Green

[11] Patent Number: 4,882,875

[45] Date of Patent: Nov. 28, 1989

[54] PLANT HOLDER APPARATUS

[76] Inventor: Kenneth P. Green, 2712 Pennsylvania, Wichita Falls, Tex. 76309

[21] Appl. No.: 289,263

[22] Filed: Dec. 23, 1988

[51] Int. Cl.⁴ .............................................. A01G 27/00
[52] U.S. Cl. .......................................... 47/79; 47/48.5
[58] Field of Search ................ 47/79, 81, 82, 39, 48.5, 47/66

[56]  References Cited

U.S. PATENT DOCUMENTS

| D. 102,332 | 12/1936 | Manenty | 47/39 |
|---|---|---|---|
| D. 245,643 | 8/1977 | Orfei . | |
| 1,536,437 | 5/1925 | Klein | 47/79 |
| 1,846,433 | 2/1932 | Morley . | |
| 2,188,875 | 1/1940 | Ellis | 47/62 |
| 2,804,468 | 10/1957 | Eliot | 47/79 |
| 2,870,574 | 1/1959 | Sheridan | 47/79 |
| 4,031,663 | 6/1977 | Brunle . | |
| 4,056,897 | 11/1977 | Pearce | 47/79 |
| 4,056,899 | 11/1977 | Close | 47/79 |
| 4,106,235 | 8/1978 | Smith . | |
| 4,244,147 | 1/1981 | Geddes | 47/39 |
| 4,317,311 | 3/1982 | Schmitt . | |

FOREIGN PATENT DOCUMENTS

| 1156464 | 11/1983 | Canada | 47/79 |
|---|---|---|---|
| 949135 | 9/1956 | Fed. Rep. of Germany | 47/79 |
| 558851 | 9/1923 | France | 47/39 |
| 2309468 | 11/1976 | France | 47/79 |
| 8588 | 4/1896 | United Kingdom | 47/80 |

Primary Examiner—Henry E. Raduazo
Attorney, Agent, or Firm—Leon Gilden

[57] ABSTRACT

A plant holder apparatus is set forth including a perimeter framework for securing an associated potted plant wherein a siphon tube originating from a fluid reservoir secured to the perimeter includes a pick-up tube and a siphon bulb to direct fluid centrally of the included potted plant. The conduit is removably securable within the reservoir by a dove-tail connection. An inner leg of the conduit is directed medially of the potted plant and provides stability to the associated plant by use of a spring clip to embracingly encompass a stem of the plant to provide support therefore.

4 Claims, 1 Drawing Sheet

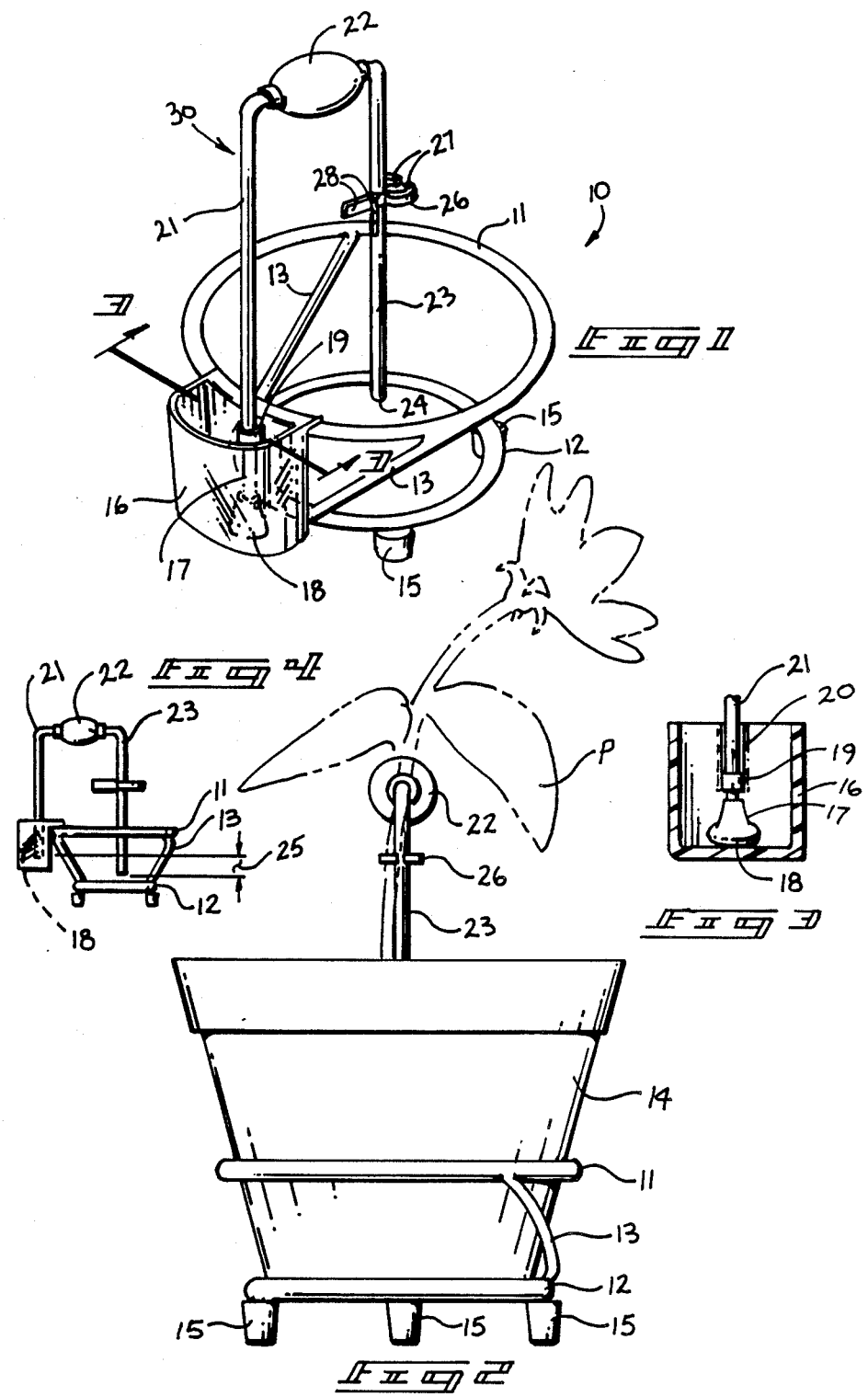

PLANT HOLDER APPARATUS

BACKGROUND OF THE INVENTION

1. Field of the Invention

The field of invention relates to plant holders, and more particularly pertains to a new and improved plant holder apparatus wherein the same selectively provides watering of a plant within a pot adjacent the root structure of the plant.

2. Description of the Prior Art

The use of plant holder apparatus is well known in the prior art. The prior art devices have included various constructions for securement of plants therein, but have heretofore failed to provide a self-watering and securement apparatus for enhancing growth and integrity of the plant structure. For example, U.S. Pat. No. 1,846,433 to Morley sets forth a plant holder with an associated handle and a downwardly depending optional spike for stabilizing the plant holder relative to a support base. The plant holder includes appropriate drainage for an included pot secured within the plant holder. The Morley patent has been cited as an example of a typical prior art plant holder.

U.S. Pat. No. 4,031,663 to Brunk sets forth a plant holder wherein the four corners are cut at downwardly inclined planes such that the corner sections cut from the rectangular block of the plant holder are utilized as legs for the plant holder apparatus wherein the patent is cited as a further prior art example of a typical plant holder.

U.S. Pat. No. 4,106,235 to Smith sets forth a plant holder for self-watering a plant wherein the container is of a diameter to include a pot securable in overlying relationship to the holder such that the roots of an associated plant within the pot may extend downwardly into a reservoir at the bottom of the holder.

U.S. Pat. No. 4,317,311 to Schmitt sets forth a plant holder or receptacle including a plurality of upstanding ribs formed interiorly and medially of the receptacle base for securement of a pot within the receptacle to enable drainage of the pot within the receptacle and allow for extended plant root system development within the receptacle.

U.S. Pat. No. Des. 245,643 sets forth a further example of a pot of typical prior art configuration representative of the pot holders currently available in the prior art.

As such, it may be appreciated that there is continuing need for a new and improved plant holder apparatus wherein the same addresses the problems of a selective self-watering of an associated plant within an included pot and further provides for stable securement of a plant within the pot.

SUMMARY OF THE INVENTION

In view of the foregoing disadvantages inherent in the known types of plant holders now present in the prior art, the present invention provides a potted plant holder wherein the same is provided with a plurality of concentric axially spaced and aligned rings wherein a top ring is of a greater diameter than a bottom ring. The aligned rings accept a tapered pot therewith wherein a reservoir chamber secured to the upper ring includes a replaceably positioned receiving conduit therewithin to be removed prior to the presentation of the pot within the apparatus. Upon repositioning the receiving tube within the reservoir, fluid may be directed therethrough by manual manipulation of an associated siphon bulb to direct fluid through a spaced conduit operatably associated with a siphon bulb. The lowermost end of the spaced conduit is of a lower elevation to that of the receiving end of the receiving conduit to enable water transmission into the pot by means of siphoning. Further, a spring clip is operably associated to the spaced conduit for securement of a plant stem of an associated plant for securement of the plant stem during growth. As such, the general purpose of the present invention, which will be described subsequently in greater detail, is to provide a new and improved potted plant holder which has all the advantages of the prior art plant holders and none of the disadvantages.

As such, the general purpose of the present invention which will be described in greater detail, is to provide a new and improved plant holder apparatus which has all of the advantages of the prior art plant holder apparatus and none of the disadvantages.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved plant holder apparatus which has all the advantages of the prior art plant holder apparatus and none of the disadvantages.

It is another object of the present invention to provide a new and improved plant holder apparatus which may be easily and efficiently manufactured and marketed.

It is a further object of the present invention to provide a new and improved plant holder apparatus which is of a durable and reliable construction.

An even further object of the present invention is to provide a new and improved plant holder apparatus which is susceptible of a low cost of manufacture with regard to both materials and labor, and which accordingly is then susceptible of low prices of sale to the consuming public, thereby making such plant holder apparatus economically available to the buying public.

Still yet another object of the present invention is to provide a new and improved plant holder apparatus which provides in the apparatuses and methods of the prior art some of the advantages thereof, while simultaneously overcoming some of the disadvantages normally associated therewith.

Still another object of the present invention is to provide a new and improved plant holder apparatus wherein the same provides for securement of a pot and effects selective watering of a plant within the pot with simultaneous securement of a plant stem to secure the stem during growth.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view taken in elevation of the instant invention.

FIG. 3 is an orthographic view taken along the lines 3—3 of FIG. 1 in the direction indicated by the arrows.

FIG. 4 is an orthographic diagrammatic view of the instant invention taken in elevation.

DESCRIPTION OF THE PREFERRED EMBODIMENT

With reference now to the drawings, and in particular to FIGS. 1 to 4 thereof, a new and improved plant holder apparatus embodying the principles and concepts of the present invention and generally designated by the reference numeral 10 will be described.

More specifically, it will be noted that the plant holder apparatus 10 essentially comprises an upper support ring 11 axially aligned with an overlying lower support ring 12 of a reduced diameter relative to the upper support ring 11. A plurality of diametrically opposed struts 13 fixedly secure the upper support ring 11 relative to the lower support ring 12. A plurality of three resilient friction pads 15 integrally secured to and downwardly directed from the lower support ring 12 frictionally maintain to the plant holder apparatus 10 to a selected support surface.

The axially aligned and spaced upper and lower support rings 11 and 12 accept a tapered plant pot 14 therewithin with an axis coincident with the axis of the upper and lower respective support rings 11 and 12.

A transparent reservoir 16 is fixedly secured to the upper support ring 12 for visual observation of fluid level within the reservoir to enable replenishment as desired. A pickup tube 17 formed with a screened receiving first end 18 is integrally secured to and directed through a dove-tail 19 interfitting with a dove-tail groove 20 formed within a rear wall of the reservoir 16.

The pick-up tube 17 is operably associated with a first conduit leg 21 directed into a siphon bulb 22. The other end of the siphon bulb 22 is directed into a second conduit leg 23 directed downwardly generally parallel to the first conduit leg 21 and formed with a second end 24 a spaced distance 25 (see FIG. 4) at a vertical spacing below that of the first end 18 to effect a siphoning action from the reservoir into the pot 14 secured within the respective upper and lower rings 11 and 12. The various portions of the self-watering members of the apparatus including members 17 through 24 comprise the siphon tube apparatus 30. The siphon tube apparatus 30 is removed from the reservoir 16 by means of vertically slotting the dove-tail 19 upwardly from the dove-tail group 20 formed in the reservoir wall to enable positioning of a pot 14 within the respective support rings 11 and 12. Upon positioning the pot 14 within the rings, the siphon tube apparatus 30 may be returned to the position as illustrated in FIGS. 1 and 2, whereupon soil and an associated plant "P" are positioned within the pot 14.

A spring clip 26 is secured to the second conduit leg 23 whereupon encircling jaws 27 actuatable by the opposed handles 28 may encircle a stem of the associated plant "P" for securement of the stem adjacent the second conduit leg to secure the plant during growth.

As to the manner of usage and operation of the present invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plant holder apparatus comprising, in combination,
    a pot, and a ring means for securement of said pot therewithin, and
    a reservoir secured to said ring means including a siphon tube apparatus;
    said siphon tube apparatus including a first conduit directed into said reservoir in fluid communication with a second directed into said pot, and
    pump means for directing fluid from said first conduit into said second conduit, and
    wherein said ring means includes an upper support ring of a first diameter axially aligned with and overlying a lower support ring of a second diameter less than said first diameter, and said pot is tapered downwardly for securement within said upper and lower rings, and including a plurality of resilient friction pads integrally secured to and downwardly directed from said lower support ring, and wherein said reservoir is transparent for visual observation of a fluid level within said reservoir, and wherein said first conduit includes a pick-up tube with a screened first end, and said pick-up tube includes a dove-tail slidably received within a dove-tail slot formed within a wall of said reservoir for selective removal of said siphon tube apparatus with respect to said reservoir.

2. A plant holder apparatus as set forth in claim 1 wherein said second conduit includes a lower terminal second end spaced vertically below said first end of said pick-up tube to enable a siphoning of fluid from said reservoir into said pot.

3. A plant holder apparatus as set forth in claim 2 wherein said pump means includes a siphon bulb operatively associated in fluid communication between said first conduit and said second conduit for directing fluid from said reservoir through said first and second conduits.

4. A plant holder apparatus as set forth in claim 3 including a spring clip, and said spring clip includes a plurality of encircling jaws for securement about a plant stem received within said pot for securement of said plant stem during growth.

* * * * *